(12) United States Patent
Lam et al.

(10) Patent No.: US 6,876,172 B2
(45) Date of Patent: Apr. 5, 2005

(54) PORTABLE BATTERY CHARGE (75) Inventors: Yuk Nam Lam, Kowloon (HK); King Mo Shum, Kowloon (HK)

(73) Assignee: Jeckson Electric Co., Ltd., Kowloon (HK)

( * ) Notice: Subject to any disclaimer, the term of this patent is extended or adjusted under 35 U.S.C. 154(b) by 0 days.

(21) Appl. No.: 10/643,761

(22) Filed: Aug. 19, 2003

(65) Prior Publication Data

US 2004/0130289 A1 Jul. 8, 2004

Related U.S. Application Data (60) Provisional application No. 60/405,639, filed on Aug. 23, 2002.

(51) Int. Cl.$^7$ .................................................. H02J 7/00
(52) U.S. Cl. ....................................... 320/110; 320/111
(58) Field of Search ........................... 320/107, 110–116, 320/118, 127, 128, 160

(56) References Cited

U.S. PATENT DOCUMENTS 4,636,703 A * 1/1987 Tohya et al. ................ 320/110
6,268,709 B1 * 7/2001 Lee et al. .................... 320/112

* cited by examiner

Primary Examiner—Michael Sherry
Assistant Examiner—Robert Grant
(74) Attorney, Agent, or Firm—Darby & Darby (57) ABSTRACT The present invention relates to a portable battery charger, which includes a charger body of charge circuit coupled to a power supply and a battery compartment pivotally coupled to the charger body. The battery compartment rotates pivotally around the charger body to provide a fold position at which both battery compartment and charge body form one unit and a charge position at which at least one battery is inserted into the battery compartment for charging. The battery charger in accordance with the present invention shrinks its size to the charger body with a feature of easy carry.

10 Claims, 6 Drawing Sheets

PORTABLE BATTERY CHARGE

CROSS REFERENCE TO RELATED APPLICATIONS

The present invention claims the benefit under 35 USC 119(e) of Provisional Application No. 60/405,639, filed on Aug. 23, 2002, now abandoned. This Provisional Application and other documents referred to elsewhere in the specification of the present application are incorporated herein by reference.

TECHNICAL FIELD

The present invention generally relates to battery charger and, more particularly, to a portable battery charger of small size and easy carry.

BACKGROUND

With rapid development of economy and business, people travel worldwide with portable electronic devices to be driven to operate by battery. Therefore, chargeable battery becomes highly demanded and as a result, battery charger becomes a necessary device in home and travel. A battery charger is generally composed of two parts, a charger body of a charge circuit coupled to an AC power supply and a battery compartment for receipt of a battery to be charged. Conventional chargers have their battery compartments attached to their charger bodies and the battery compartments have fixed sizes to hold particular batteries such as either AA or AAA type batteries.

At opposite of the battery compartment, two conductors connected to the charging circuit are arranged to provide contact with a chargeable battery for charging it. A battery is fit into the battery compartment for charging and taken out therefrom after charging. However, since the battery compartment is attached to the charger body, conventional battery charger is of large volume, causing inconvenience for carrying and handling.

Accordingly, what is needed is a portable battery charger of a size same as its charger body. Moreover, the portable battery charger may charge batteries of different sizes and standards.

DESCRIPTION

An objective of the present invention is to provide a portable charger that is easily carried with small size and allows different size of batteries to be charged.

A battery charger in accordance with the present invention includes a charger body having a charge circuit coupled to a power supply, at least one first conductor electrically coupled to the charge circuit, and at least one first contact electrically coupled to the charge circuit; and a battery compartment having at least one second contact electrically coupled to the first contact and at least one second conductor electrically coupled to the second contact. The battery compartment is coupled to the charge body so that at a fold position, the battery compartment forms one unite with the charger body while at a charge position, the battery compartment accommodates at least one chargeable battery for charging.

In accordance with one embodiment of the present invention, the first and second contacts are in opposition at the charge position.

While the battery compartment is pivotally coupled to the charger body to allow it to rotate around the charger body, a push-pull embodiment is also available for the battery compartment to be pushed into the charge body to provide the fold position and pulled out the charge body to provide the charge position. Furthermore, the battery compartment is detachably coupled to the charge body.

In accordance with one aspect of the present invention, a rotational holder of the first conductor is coupled to the charger body so that the size of the battery compartment becomes adjustable as the rotational holder rotates. In accordance with the other embodiment of the present invention, a second rotational holder of the first conductor is coupled to the charger body so that when the first rotational holder is at the horizontal position, the second rotational holder is at the vertical position. Thus, the battery charger in accordance with the present invention is applied to charge batteries of different sizes and standards.

Besides, the battery compartment has two locking bolts and the charge body has two locking nuts correspondingly and the locking bolts are electrically and pivotally coupled to the locking nuts, which realizes wireless connection between these two parts, bringing longer lifetime of the battery charger.

In order for the battery charge to be applied to different kinds of batteries, the charger body further provides a switch for choosing battery types.

The battery charger in accordance with the present invention has features of small size, easy carry, and universal application. It greatly alters the conventional structure of battery chargers.

PREFERRED EMBODIMENTS

Figure 1:
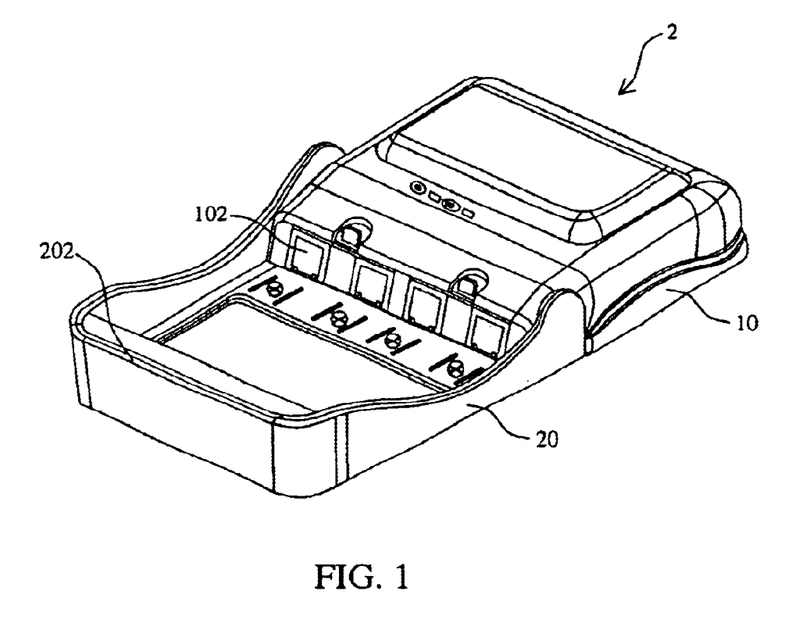
FIG. 1 shows a first embodiment of the battery charger in accordance with the present invention at a charge position.
Figure 2:
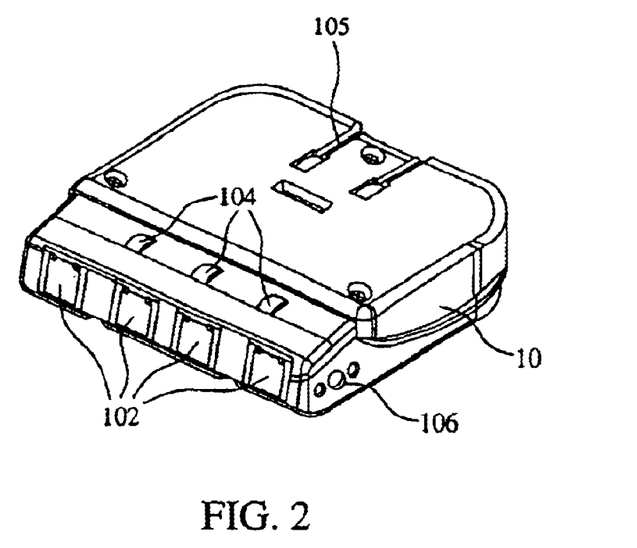
FIG. 2 illustrates a first embodiment of the charger body in accordance with the present invention.

Referring to FIG. 1, the battery charger 2 in accordance with the present invention includes a charger body 10 that has a charger circuit (not shown in FIG. 1) composed of an AC/DC converter circuit and a charge control circuit and a charger compartment 20 pivotally coupled to charger body 10. The charger body 10 has a plurality of conductors 102 arranged on the side adjacent to charger compartment 20. Correspondingly, in opposition to conductors 102, a plurality of conductors 202 is arranged on charger compartment 20, as shown in FIG. 2. Chargeable batteries are fit into the space defined by charger compartment 20 for charging by the charging circuit via conductors 102 and 202.

As shown in FIG. 2, charger body 10 in accordance with the present invention has a plurality of (for example three) contacts 104 arranged at its bottom and two locking nuts 106 arranged on its both sides. The three contacts 104 are electrically coupled to the charge circuit of charger body 10 via interconnection. Furthermore, a plug pin 105 is provided on charger body 10. The plug pin 105 is for connecting power supply on walls to the charge circuit in charger body 10 and is 90 degree rotatable for the purpose of space saving.

Figure 3:
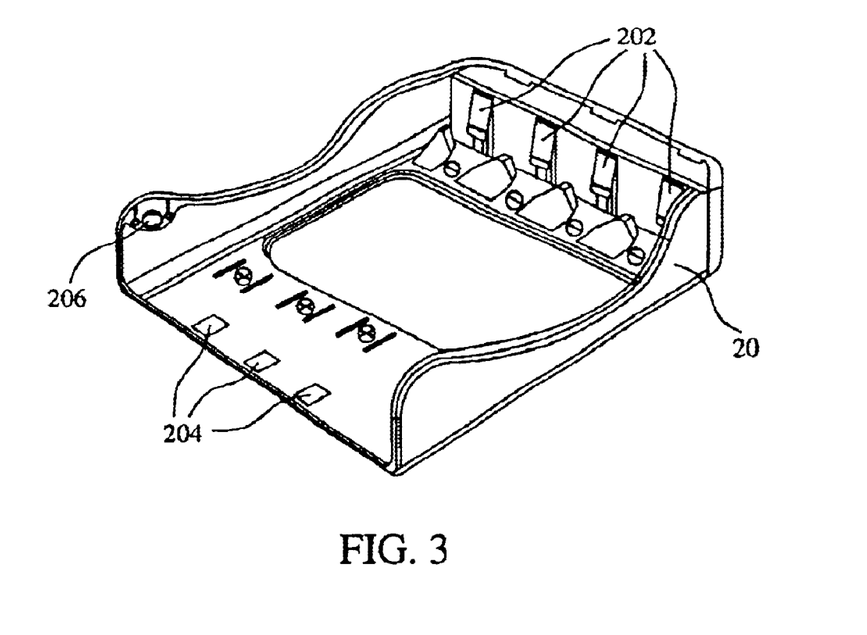
FIG. 3 illustrates a first embodiment of the battery compartment in accordance with the present invention.

Correspondingly, referring to FIG. 3, battery compartment 20 has a plurality of (for example, three) contacts 204 arranged at its bottom and two locking bolts 206 arranged on its both sidewalls. The three contacts 204 are electrically coupled to the plurality of conductors 202 via internal connection. By means of locking nuts 106 and locking bolts 206, battery compartment 20 is pivotally and detachably coupled to charger body 10 so that at the charge position as shown in FIG. 1, contacts 104 of charger body 10 are electrically coupled to contacts 204 of battery compartment 20. As a result, the plurality of conductors 202 of battery compartment 20 is electrically coupled to charge circuit of charger body 10 via electrical coupling of contacts 104 and contacts 204. Thus, conductors 102 and 202 and the charge circuit institute a complete circuit in charging a battery. Furthermore, since charger body 10 and battery compartment 20 are coupled in a form of wireless, no cord is required between these two parts. The touch-connection avoids cord linkage, by which fracture of cords can be prevented even when battery compartment 20 is separated from charger body 10, thus increasing reliability of the battery charger in accordance with the present invention. Furthermore, due to the detachability of these two parts, each of them becomes individual which is easy to repair and to replace.

As the other embodiment, via interconnection, locking nuts 106 are electrically coupled to the charge circuit and conductors 102, locking bolts 206 are electrically coupled to conductors 202, and locking nuts 106 are electrically coupled with locking bolts 206. In such an arrangement, locking nuts 106 and locking bolts 206 function as both electrical contact and pivotal connector and therefore, no contacts 104 and 204 are required.

Figure 4:
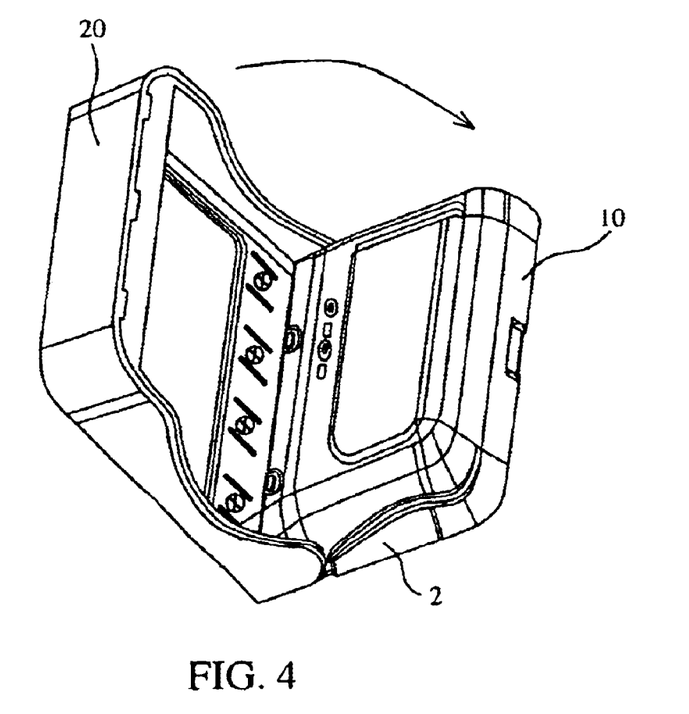
FIG. 4 shows that the battery charger of FIG. 1 is folded from the charge position to a fold position.
Figure 5:
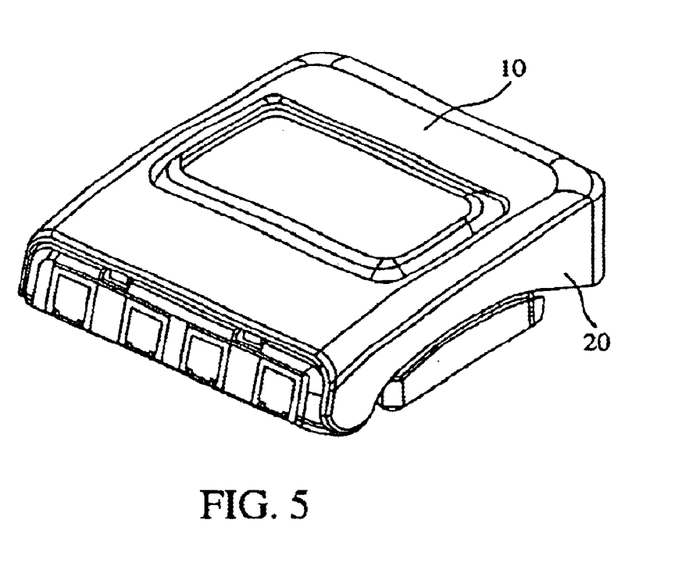
FIG. 5 illustrates the state when the battery charger in accordance with the present invention is fully folded.

FIG. 4 shows that the battery charger 2 of FIG. 1 is being pivotally folded from the charge position to a fold position that is illustrated in FIG. 5. At the fold position, battery compartment 20 forms one unit with the charge body 10 so that battery charger 2 in accordance with the present invention is of a size almost same as charge body 10. Therefore, the volume of battery charger 2 in accordance with the present invention significantly shrinks when battery compartment 20 is fully folded.

Also, the coupling of charge body 10 and battery compartment 20 may be push-pulled. At the fold position, battery compartment 20 is pushed into a receipt arranged on charge body 10 so that both parts form one unite. When battery compartment 20 is pulled out from charge body 10, the charge position is provided for receipt of batteries for charging.

Figure 6:
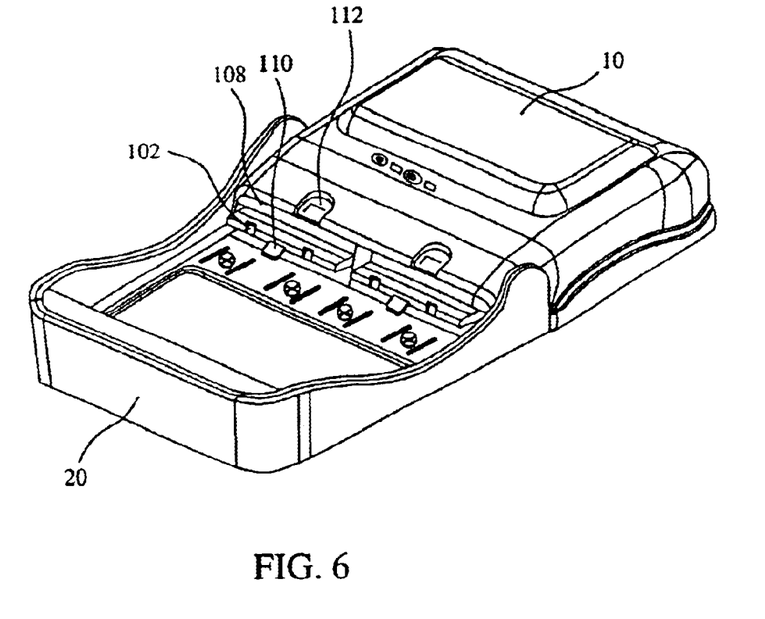
FIG. 6 shows a second embodiment of the battery charger in accordance with the present invention.
Figure 7:
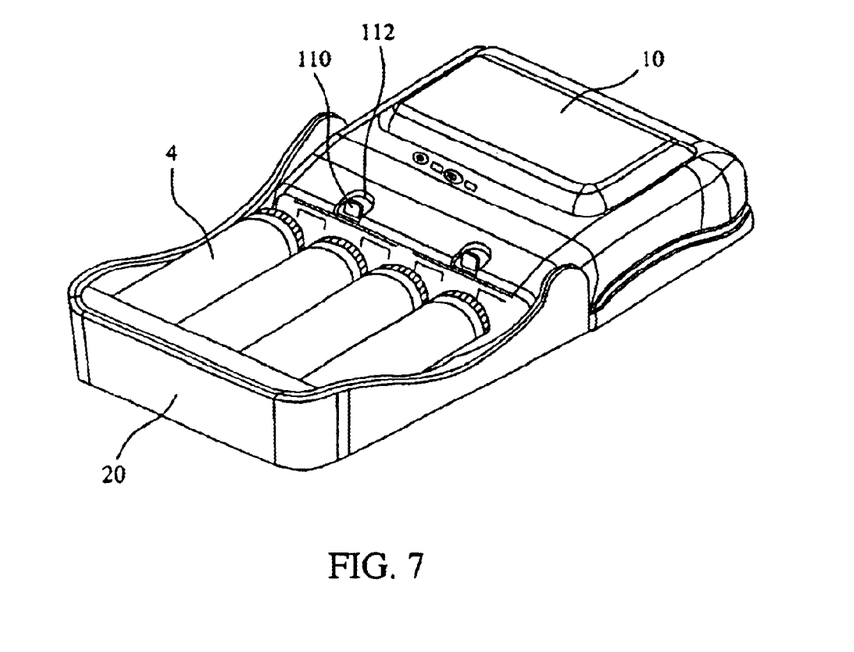
FIG. 7 illustrates the battery charger of FIG. 6 for charging AA batteries.
Figure 8:
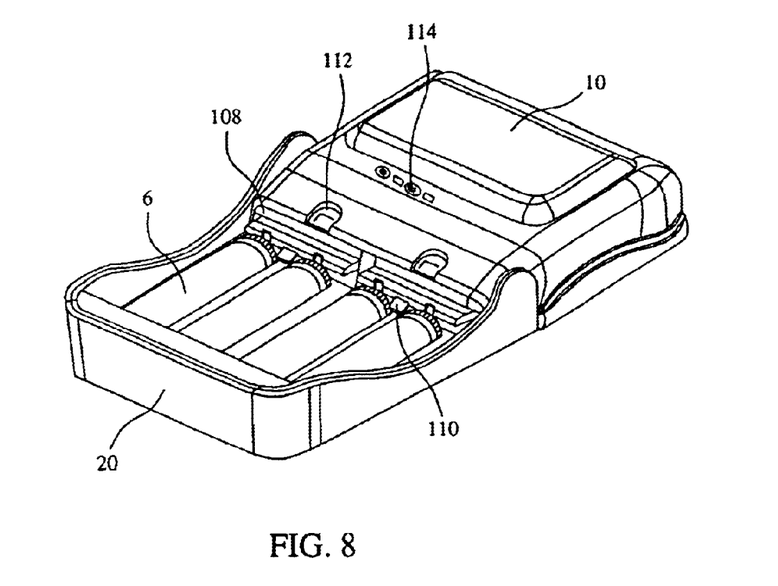
FIG. 8 illustrates the battery charger of FIG. 6 for charging AAA batteries.

A second embodiment of the battery charger in accordance with the present invention includes two holders 108 that are rotatedly coupled to charge body 10, as shown in FIG. 6. Each of the two holders 108 has a locator 110 and two conductors 102 and two stoppers 112 are arranged on charge body 10. The holders 108 can freely rotate from a horizontal position (0 degree) to a vertical position (90 degrees), adjusting the space to accommodate batteries for charging. For example, at the vertical position, each of the two holders 108 rotates until its locator 110 reaches stopper 112. Then, a large space is provided within battery compartment 20 for receipt of an AA battery 4 for charging, as shown in FIG. 7. Alternatively, at the horizontal position, holders 108 define the space within battery compartment 20 for receipt of an AAA battery 6 for charging, as shown in FIG. 8.

In accordance with another embodiment of the present invention, each of these two holders 108 may be respectively rotated so that one is at horizontal position and the other one at vertical position. Thus, within battery compartment 20, batteries of different sizes, for example AAA and AA, may be simultaneously accommodated for charging. Preferably, a battery selection switch 114 is provided on the basis of the charge circuit, allowing users to select from different kinds of batteries, such as Ni—Cd or Ni-MH, for charging.

While there have been illustrated and described what are considered to the preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A battery charger comprising:
   a charger body having
     a charge circuit coupled to a power supply;
     at least one first conductor electrically coupled to said charge circuit; and
     at least one first contact electrically coupled to said charge circuit; and
   a battery compartment having
     at least one second contact electrically coupled to said first contact;
     at least one second conductor electrically coupled to said second contact;
     said battery compartment being coupled to said charger body so that at a fold position said battery compartment forms one unit with said charger body, while at a charge position said battery compartment accommodates at least one battery for charging.

2. The battery charger as recited in claim 1 wherein said battery compartment is pushed into said charger body to provide said fold position and pulled out said charger body to provide said charge position.

3. The battery charger as recited in claim 1 wherein said battery compartment is pivotally coupled to said charger body.

4. The battery charger as recited in claim 1 wherein said first and second conductors are in opposition at said charge position.

5. The battery charger as recited in claim 1 further including a first rotational holder of said first conductor, said rotational holder being coupled to said charger body so that said first rotational holder rotates to zero degrees to provide a horizontal position and to 90 degrees to provide a vertical position.

6. The battery charger as recited in claim 5 further including a second rotational holder of said first conductor so that when said first rotational holder is at the horizontal position, said second rotational holder is at the vertical position.

7. The battery charger as recited in claim 1 wherein said battery compartment is detachably coupled to said charger body.

8. The battery charger as recited in claim 3 wherein said battery compartment has two locking bolts and said charger body has two locking nuts and said locking bolts are electrically and pivotally coupled to said locking nuts.

9. The battery charger as recited in claim 1 wherein said charger body further includes a switch for choosing battery types.

10. The battery charger as recited in claim 6 wherein said battery compartment has two locking bolts and said charger body has two locking nuts and said locking bolts are electrically and pivotally coupled to said locking nuts.

* * * * *

UNITED STATES PATENT AND TRADEMARK OFFICE
CERTIFICATE OF CORRECTION

PATENT NO. : 6,876,172 B2
DATED : April 5, 2005
INVENTOR(S) : Yuk Nam Lam et al.

It is certified that error appears in the above-identified patent and that said Letters Patent is hereby corrected as shown below:

Title page,
Item [54], Title, please delete "PORTABLE BATTERY CHARGE" and substitute -- PORTABLE BATTERY CHARGER --.

Signed and Sealed this

Seventh Day of June, 2005

JON W. DUDAS
*Director of the United States Patent and Trademark Office*